United States Patent [19]

Fontana et al.

[11] Patent Number: 5,494,997
[45] Date of Patent: Feb. 27, 1996

[54] PREPARATION OF BY THE BISCHLOROFORMATE PROCESS OF SOFT SEGMENT POLYCARBONATE

[75] Inventors: Luca P. Fontana, Brasschaat, Belgium; Paul W. Buckley; Eugene Boden, both of Scotia, N.Y.

[73] Assignee: General Electric Company, Pittsfield, Mass.

[21] Appl. No.: 283,691

[22] Filed: Aug. 1, 1994

[51] Int. Cl.⁶ .................................................. C08G 64/00
[52] U.S. Cl. ........................ 528/371; 528/176; 528/179; 528/193; 528/196; 528/370; 528/372; 528/198
[58] Field of Search ..................................... 528/176, 179, 528/193, 196, 198, 370, 371, 372

[56] References Cited

U.S. PATENT DOCUMENTS

| | | | |
|---|---|---|---|
| 4,737,573 | 4/1988 | Silva et al. | 528/371 |
| 4,743,676 | 5/1988 | Silva et al. | 528/371 |
| 4,983,706 | 1/1991 | Fontana et al. | 528/176 |

Primary Examiner—James J. Seidleck
Assistant Examiner—Terressa Mosley

[57] ABSTRACT

A process for preparing a polyestercarbonate copolymer which is nearly devoid of diaryl-carbonates and that exhibits a glass transition temperature lower than bisphenol-A carbonate homopolymer, and that shows improved processability is herein described. The desired lower Tg and improved flow can be achieved by the polycondensation of a dihydric phenol and aliphatic dicarboxylic acid. The condensate is polymerized with a carbonate forming reagent.

24 Claims, No Drawings

PREPARATION OF BY THE BISCHLOROFORMATE PROCESS OF SOFT SEGMENT POLYCARBONATE

BACKGROUND OF THE INVENTION

1. Field of the Invention

The invention relates to thermoplastic resin compositions and more particularly relates to improved copolyestercarbonate resins and their preparation.

2. Brief Description of the Prior Art

Aromatic copolyestercarbonate resins are a well known class of synthetic polymeric resins, generally prepared by the reaction of a polyhydric phenol with a carbonate precursor in the presence of an ester precursor; see for example U.S. Pat. No. 3,169,121. Although such resins have been found to be thermoplastically moldable under a broad range of molding conditions, only select copolyestercarbonate resin compositions are useful for commercial molding operations. This is due to the requirements of processability for a thermoplastic resin related to their melt flow behavior.

Furthermore, even though a given copolyestercarbonate resin may have the physical properties required for successful thermal molding, the product articles may be deficient in certain other physical properties otherwise desired. For example, the molded articles may lack a desired degree of impact strength, particularly at low temperatures.

Those skilled in the art have found that polyestercarbonate resins of a particular class exhibit a lowered glass transition (Tg) temperature and improved low temperature impact strengths. The Tg of the resin is reduced by the presence of aliphatic diester blocks.

The rheological behavior and reduced glass transition temperatures of these resins have use in injection molding. An example of such an application is in molded computer and business equipment housings. These parts require materials with reduced viscosities at shear rates experienced during mold filling in the injection molding process.

Examples of prior art descriptions of the above-described polyestercarbonate resins having aliphatic diester blocks are found in the U.S. Pat. Nos. 4,238,596; 4,238,597; 4,280,683; 4,628,081; 4,677,183; and 4,983,706. These resins, as described, were all prepared by the well-known interfacial polymerization method, which has many advantages over direct polymerization in organic solvents such as described in the U.S. Pat. No. 3,030,331.

Although the reaction conditions of the preparative interfacial polymerization processes may vary, several of the preferred processes typically involve dissolving or dispersing a dihydric phenol and an ester precursor reactant in aqueous caustic, adding the resulting mixture to a suitable water immiscible solvent medium and contacting the reactants with a carbonate precursor, such as phosgene, in the presence of a suitable catalyst and under controlled pH conditions. For example, in the process described in U.S. Pat. No. 4,983,706, phosgene is introduced into an aqueous solution of the alkali metal salt of a dicarboxylic acid ester precursor and the diphenol in methylene chloride, in the presence of a phase-transfer catalyst as well as a molecular weight regulator, usually a monofunctional phenol.

Polyestercarbonate resins containing aliphatic diester blocks, prepared by the prior art interfacial polymerization techniques are limited in two respects. First, the incorporation of short chain diacid moieties (i.e.; less than about 9 carbon atoms) is limited due to their high solubility in the aqueous phase. Generally, even with high excess diacid reactant, there is incomplete incorporation of the diacid moiety into the product copolymer. Secondly, undesirable amounts of diaryl carbonate are generally formed as a by-product of the polymerization. This contaminant is relatively volatile and will "plate out" during thermal processing onto molds and processing equipment. The contaminant will volatilize and then condense on the surfaces of molds, processing equipment and the molded articles themselves.

The process of the present invention incorporates into the resin backbone aliphatic diester blocks from a wide variety of aliphatic dicarboxylic acids through a rapid reaction with oligomeric bischloroformates, to form very reactive mixed carboxylic carbonic anhydride intermediates which immediately decompose to form ester and/or anhydride linkages. Any simple anhydrides formed during this step are easily converted to esters during the following polymerization step.

A reduction in diaryl carbonate is also obtained through the addition of a chainstopper to the reaction mixture subsequent to polymerization. Thus, the advantages of this process include the reduction of diaryl carbonate contaminate in the final polymer and the ability to fully incorporate any dicarboxylic acid chain moieties into the polymer.

Melt processable copolyestercarbonates having relatively high glass transition temperatures (on the order of 180° C. or more) are described in the U.S. Pat. No. 4,310,652 (DeBons et al., Jan. 12, 1982). The term "low glass transition temperature" or "reduced Tg" as used in the present invention means a Tg of less than 145° C.

The copolyestercarbonate resins produced by the method of the invention are useful to fabricate sound and image reproduction articles such as compact discs ("CDs") and the like.

SUMMARY OF THE INVENTION

The invention comprises a process for the preparation of a thermoplastic, copolyestercarbonate having a polymer backbone made up of recurring carbonate structural units of the formula:

wherein D is a divalent aromatic radical residue of the dihydric phenol employed in the preparative polymerization reaction; and repeating or recurring carboxylic chain units of the formula:

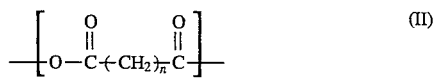

wherein n is a whole number integer of from 0 to 36, preferably 6 to 12, which comprises;

phosgenating the dihydric phenol in the presence or absence of an aliphatic dicarboxylic acid of formula:

wherein n is as defined above, under conditions which yield an excess of chloroformate end-groups relative to phenolic or carboxylic acid moieties; and polymerizing the chloroformates with remaining phenols and carbonate acids or with subsequently added aliphatic dicarboxylic acid of the formula (III), by addition of a carbonate forming reagent and a molecular weight regulator.

The Invention also comprises resins prepared by the method of the invention. The copolyestercarbonate resins of the invention exhibit a low Tg, i.e.: a low glass transition temperature and freedom from substantial quantities of diaryl carbonate by-product of the preparative process.

The invention also comprises articles thermally molded from compositions of the invention. The articles of the invention are useful as bottles, tool and instrument housings, automotive structural components and the like.

DETAILED DESCRIPTION OF THE PREFERRED EMBODIMENTS OF THE INVENTION

The polymer backbone structural units of the formula (I) described above are derived from dihydric phenols. Representative of dihydric phenols which may be employed in the process of the invention are those of the formula:-

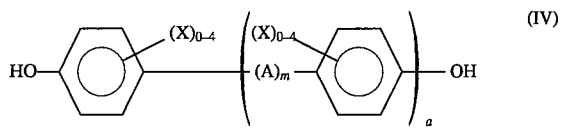

(IV)

wherein A is a divalent hydrocarbon radical containing from 1 to about 15 carbon atoms; a substituted divalent hydrocarbon radical containing from 1 to about 15 carbon atoms and substituent groups such as halogen;

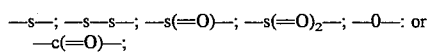

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and a is an integer of from 0 to 5.

Typical of some of the dihydric phenols that can be employed in the practice of the present invention are bisphenols such as (4-hydroxy-phenyl)methane, 2,2-bis(4-hydroxyphenyl)propane (also known as bisphenol-A), 2,2-bis(4-hydroxy-3,5-dibromophenyl)-propane; dihydric phenol ethers such as bis(4-hydroxy-phenyl) ether, bis (3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxy-phenyl) sulfoxide and bis((3,5-dibromo-4-hydroxy-phenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

In the dihydric phenols employed, the reactive groups are the two phenolic hydroxyl groups.

The carboxylic chain units of the formula (II) given above are derived from aliphatic dicarboxylic acids or the corresponding salts (ester precursors) of the formula III given above.

Representative of the dicarboxylic acids of the formula (III) are oxalic, malonic, glutaric, adipic, succinic, suberic, sebacic, azelaic, undecanedioic, dodecanedioic dicarboxylic acids and the like and polymeric fatty acids. The polymeric fatty acids, sometimes referred to in the art as "dimer acids", are complex mixtures resulting from the polymerization of fatty acids. Representative of polymeric fatty acids are those commercially available from the polymerization of tall oil fatty acids. These polymeric fatty acids have a typical composition as follows:

|  | % BY WEIGHT |
| --- | --- |
| $C_{18}$ monobasic acids (monomer) | 0–5 |
| $C_{36}$ dibasic acids (dimer) | 60–95 |
| $C_{54}$ and higher polybasic acids (trimer) | 1–35 |

The relative ratios of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681. Methods of preparing these preferred acids are well known, and they are readily available commerically.

Preferred dicarboxylic acids employed in the invention are straight chain aliphatic diacids having at least 6 carbon atoms and more preferably 6 to 12 carbon atoms such as azelaic, sebacic and dodecanedioic acids.

In the process of the invention, the dicarboxylic acids of the formula (III) given above are used as the free dicarboxylic acids (III) or in the form of their reactive alkali metal derivatives or salts. The alkali metal salt of the dicarboxylic acid which can be employed in the polymerization process can be any of the alkali metal salts, selected from the groups consisting of the alkali group and the alkaline earth groups. Specifically, these include potassium, sodium, lithium, calcium, magnesium and like alkali metal salts of the dicarboxylic acids of formula (III) given above.

Mixtures of these dicarboxylic acid salt derivatives may be employed. Therefore, where the term dicarboxylic acid is used herein it is to be understood that this term includes mixtures of two or more salts of the dicarboxylic acids of formula III.

In accordance with the process of the invention, there is a first step wherein the dihydric phenol or a mixture of dihydric phenol and an aliphatic dicarboxylic acid (III) is phosgenated to form a pre-polymer reaction mixture containing the corresponding chloroformates together with various oligomers and unreacted starting materials. The phosgenation is advantageously carried out in the presence of an inert organic solvent. An inert solvent is one which does not enter into the esterification reaction or adversely affect the desired course of the phosgenation.

Representatives of such solvents include methylene chloride, 1,2-dichloroethane, chlorobenzene, toluene and the like.

The phosgenation of the dihydric phenol (IV) in an inert solvent may also be carried out in the presence of the aliphatic dicarboxylic acid (III) or salt described above. In fact, the phosgenation step may be carried out in a reaction mixture containing all the reactants for an interfacial polymerization to obtain a copolyestercarbonate resin, except that it should not contain an effective proportion for polymerization, of the polymerization catalyst or of any molecular weight regulator. Advantageously, the phosgenation reaction is carried out at a pH within the range of from 8 to 11, preferably 8.5 to 10.0, by addition of an aqueous alkali or alkaline earth metal solution. Representative of alkali and alkaline earth metal solutions are aqueous solutions of sodium and potassium hydroxide. The phosgenation reaction will therefore produce the oligomeric bischloroformate intermediates which subsequently react with the dicarboxylic acid moieties or any remaining phenolic species in the following polymerization reaction.

A tertiary amine may be present in the phosgenation reaction to produce the oligomeric bischloroformate intermediates, as an acid acceptor. However, it should not be present in a quantity which will function as a polymerization catalyst. In general, about 50 PPM of the reaction mixture is sufficient as an acid acceptor.

The phosgenation reaction proceeds advantageously at a temperature of from 0° to 100° C., preferably about reflux temperature for the reaction mixture. Since the reaction is exothermic, the rate of phosgene addition may be used to control the reaction temperature. The amount of phosgene required will generally depend upon the amount of polyfunctional organic reactant compounds present.

In the second step of the process of the invention, the reaction product of the phosgenation (step 1) of the dihydric phenol (IV) is subjected to polymerization with a carbonate forming reagent and a suitable molecular weight regulator.

If the aliphatic dicarboxylic acid was not added in the first step, it should be added prior to the addition of the carbonate forming reagent.

The prior art catalysts for promoting polymerizations are employed in catalytic proportions, see for example the catalysts and proportions described in U.S. Pat. No. 4,983,706, incorporated herein by reference thereto.

In general, an effective amount of polymerization catalyst is within the range of from about 0.75 to about 3.0 mole percent of the dihydric phenol (IV) employed in Step 1.

The catalyst employed accelerates the rate of polymerization of the chloroformates with the carbonate forming reagent. Representative catalysts include but are not limited to the tertiary amines, phosphonium catalysts and the like. Triethylamine is a preferred catalyst.

The carbonate precursor can be either a carbonyl halide or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

A molecular weight regulator is necessarily added to the polymerization reaction, subsequent to phosgene depletion in Step 1 and prior to addition of the carbonate forming reagent. This serves to partially cap the bischloroformate intermediates, thereby limiting the overall weight average molecular weight of the polyestercarbonate product resin.

The molecular weight regulators which can be employed in the process include monohydric phenols such as phenol, chroman-I [4-(2,4,4-trimethylchromanyl)phenol], p-t-butyl phenol, 4-p-cumyl phenol and the like. Preferably, phenol or 4-p-cumyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2–5 mol % and more preferably from 2.5–4.5 mol % of the phenol used in Step 1 as the molecular weight regulator.

The temperature of the polymerization reaction is advantageously maintained within the range of from about 0° C. to 100° C., preferably 0° C. to about 50° C. Advantageously, the polymerization is carried out at a pH of from 10 to 12.5 by addition of an alkali solution.

The proportions of the other reactants employed to prepare the copolyester-carbonate resins of the invention will vary in accordance with the proposed use of the product resin. Those skilled in the art are aware of useful proportions, as described in the U.S. patents referred to above. In general, the amount of the ester may be from about 1 to about 45 mole percent, relative to the carbonate. For example, 6 moles of bisphenol A reacting completely with 4 moles of diacid would give a copolyestercarbonate of 40 mole percent ester.

Additional embodiments of the invention include blends of thermoplastic molding compositions containing minor proportions (less than 50 percent by weight) of polycarbonate homopolymers in admixture with the copolyester-carbonate resins of the invention.

Polycarbonate homopolymer resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; 4,188,314; 4,737,573; and 4,743,676, all of which are incorporated herein by reference thereto.

The resins prepared in accordance with the method of the invention may also be branched.

Branching of the resin results from the inclusion of a polyfunctional organic compound, which is a branching agent. The polyfunctional organic compound employed may be, for example, 1,1,1-tris-(4-hydroxyphenyl) ethane, trimellitic triacid or like agents. The branching agent is used to make branched aromatic copolyester-carbonates having an IV of about 0.3 to 1.0 dl/g as measured in methylene chloride at 25° C. These branched copolyester-carbonates are substantially free of crosslinking.

In the preparation of the branched copolyestercarbonates of this invention, the amount of the branching agent which-is reacted with the dihydric phenol and the carbonate precursor is critical to the extent that the amount employed must be sufficient to produce a true thermoplastic randomly branched resin which is substantially free of crosslinking. If an amount of branching agent employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly 0.01–1.0 mole percent of the branching agent, based upon the total moles of dihydric phenol.

Thermoplastic compositions of the invention may also be compounded by mixing the copolyestercarbonate resins of the invention with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; impact modifiers and color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The following examples describe the manner and process of making and using the invention and set forth the best mode contemplated by the inventor for carrying out the invention but are not to be construed as limiting the scope of the invention. All parts are by weight. Test results are in accordance with the following test methods.

Glass Transition Temperature (Tg) was determined by differential scanning calorimetry (DSC) using a DuPont 900 thermal analyzer and is reported as ° C.

Molecular Weight ($M_w$)

The weight average molecular weight ($M_w$) was determined by gel permeation chromatography (GPC) in methylene chloride relative to polycarbonate standards using a UV detector at 254 nm.

Melt Flow Rate (MFR)

Determined at 300° C. according to Test Method ASTM D-1238 and reported in grams/10 minutes.

EXAMPLE 1

A mixture of 2.27 kg (9.96 moles) of bisphenol A (BPA), 6.8 liters of methylene chloride, 3.1 liters of water, 221.3 g (0.96 mole) of dodecanedioic acid (DDDA) sodium salt predissolved in 2.2 liters of water and 150 ml (2.85 moles) sodium hydroxide (50 wt %) and 0.5 ml (5 mmol.) triethylamine was charged to a 35-liter glass reactor and the pH was adjusted to 8.0 by the addition of 50% aqueous sodium hydroxide solution. The mixture was stirred.

Phosgene was introduced into the reaction mixture over a period of 43 minutes to a total of 1720 grams while the pH was maintained at 8.2–8.5, followed by the addition of 127.15 grams (0.06 mol) of p-cumylphenol as a solution in 1.0 liter of methylene chloride. The pH was raised to 10.5 by the addition of further base. Triethylamine, 28 ml (0.20 moles), was added and stirring was continued for 15 minutes. An additional 80 grams of phosgene was added to ensure complete polymerization. The organic layer was separated and washed twice with aqueous hydrochloric acid and five times with water, after which the product polymer was isolated by steam precipitation and dried. The polymer product was found to have a weight average molecular weight of 33,925 and to contain less than 50 PPM of diaryl carbonate contaminant. This first example describes the bischloro-formate (BCF) procedure used with the dodecanedioic acid sodium salt solution in water added with the BPA monomer before phosgenation.

EXAMPLE 2

The second example was run identical to Example 1 with the exception that the DDDA salt solution was added after BPA bischloroformate formation was completed.

The 35-liter reactor was charged as described above with the exception that the DDDA sodium salt solution in water was added just prior to increasing the pH from 8 to 10.5 (after phosgenation was completed). DDA, 231.15 grams (0.96 moles) predissolved in 2.2 liters of water and 150 ml (2.85 moles) of aqueous sodium hydroxide. The pH was raised by the addition of further base and the polymerization was effected by the addition of triethylamine. The product was extracted, precipitated and dried as in Example 1 and analysis confirmed a weight average molecular weight of 34,115 and less than 50 PPM of diaryl carbonate contaminant.

EXAMPLES 3–5

Repeating the procedure of Example 1, supra., three additional times with different levels of molecular weight regulator, polyestercarbonate polymers were obtained with the physical properties shown in Table 1, below. The polymers exhibited less than 50 PPM of diaryl carbonate contaminant.

EXAMPLES 6–8

For purposes of comparison, diarylcarbonate-free polycarbonates were prepared as described in U.S. Pat. Nos. 4,737,573, 4,743,676 and 4,973,664 by the known interfacial polymerization technique. Three resins were prepared as follows:

A mixture of 2.28 kg (9.96 moles) of bisphenol A, 6.8 liters of methylene chloride, 3.1 liters of water and 0.5 ml (5 mmol) of triethylamine was charged to a 30 liter glass reactor and the pH was adjusted to 10.5 by the addition of 50% aqueous sodium hydroxide solution.

Phosgene was introduced over 22 minutes to a total of 1100 grams (11.12 moles) while the pH was maintained at 8.2–8.5 by the addition of 50% aqueous sodium hydroxide solution. To the phosgene free solution was added 32.25 grams (0.35 moles) of phenol as a solution in 2.1 liters of deionized water. The pH was raised to 10.5 by the addition of more base and 14 ml (0.10 mole) of triethylamine was added to catalyze the polymerization. The solution was stirred for an additional 15 minutes after which time an additional 250 grams (2.53 moles) of phosgene was added to ensure complete polymerization.

The organic layer was separated and washed twice with aqueous hydrochloric acid solution and extracted five times with deionized water. The desired polycarbonate product was isolated by steam precipitation and dried in a hot nitrogen fed fluidized bed drier. The level of diarylcarbonate contaminant was found to be less than 50 ppm in the product.

The procedure was repeated two additional times with different levels of molecular weight regulator, and the resulting polymers were tested for physical properties. Those properties are reported in the Table 1, below, as Examples 6–8, inclusive.

TABLE I

| EXAMPLE | 3 | 4 | 5 | COMPARATIVE EXAMPLES | | |
| --- | --- | --- | --- | --- | --- | --- |
| | | | | 6 | 7 | 8 |
| Mw | 22900 | 26200 | 33200 | 23000 | 26300 | 33000 |
| MFR @ 300° C. (g/10 min) | 45 | 27 | 13 | 24 | 11 | 5 |
| Tg. (°C.) | 124 | 125 | 127 | 146 | 148 | 148 |

As shown in Table 1, above, the effect of incorporating the aliphatic diacid into the polymer chain results not only in a polymer having a lower Tg, but also in enhanced melt flow properties.

We claim:

1. A process for the preparation of a thermoplastic, copolyestercarbonate having a polymer backbone made up of recurring carbonate structural units of the formula:

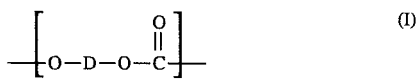   (I)

wherein D is a divalent aromatic radical residue of a dihydric phenol of the formula:

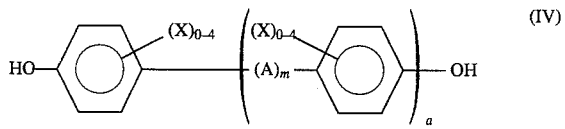   (IV)

wherein A is a divalent hydrocarbon radical containing from 1 to about 15 carbon atoms; or a substituted divalent hydrocarbon radical containing from 1 to about 15 carbon atoms and halogen substituents;

—S—; —S—S—; —S(=O)—; —S(=O)$_2$—; —O—; or —C(=O)—;

wherein each X is independently selected from the group consisting of hydrogen, halogen, an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, and an aryloxy group of from 6 to 18 carbon atoms; and wherein m is zero or 1 and n is an integer of from 0 to 5 employed in a preparative polymerization reaction; and repeating or recurring carboxylic chain units of the formula:

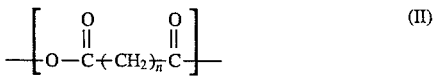   (II)

wherein n is a whole number integer of from 6 to 36, which comprises;

a) phosgenating a dihydric phenol in the presence of an aliphatic dicarboxylic acid of formula:

HOOC–(CH$_2$)$_n$–COOH   (III)

wherein n is as defined above, at a temperature of from 0° to 100° C. to yield an excess of chloroformate end-groups relative to phenolic or carboxylic acid moieties; and no phosgene remains;

b) adding a carbonate forming reagent and a chain stopper; and c) polymerizing the chloromates with any remaining phenols and carbonate acids at a pH of from 10 to 12.5.

2. The process of claim 1 wherein A represents propylene, X is hydrogen, m is 1 and a is 1.

3. The process of claim 1 wherein n is 8.

4. The process of claim 1 wherein n is 10.

5. The process of claim 1 wherein the carbonate forming reagent is phosgene.

6. The process of claim 1 wherein a minor amount of a branching agent having at least three ester forming groups is added to the reaction.

7. A thermoplastic molding composition product of the process of claim 1.

8. An article molded from the copolyestercarbonate of claim 1.

9. A process for the preparation of a thermoplastic, copolyestercarbonate, which comprises;

a. phosgenating a dihydric phenol in the presence of an inert solvent under conditions whereby the bischloroformate oligomer of the phenol is obtained;

b. adding to the reaction mixture an aliphatic dicarboxylic acid of the formula:

HOOC–(CH$_2$)$_n$–COOH wherein n is a whole number integer of from 6 to 36;

c. adding a molecular weight regulator to the phosgenated reaction mixture; and d. polymerizing the oligomer with the dicarboxylic acid at a pH of from 10 to 12.5; whereby the copolyestercarbonate is obtained.

10. The process of claim 9 wherein the aliphatic dicarboxylic acid is added to the reaction mixture after phosgenation.

11. The process of claim 9 wherein the aliphatic dicarboxylic acid is added to the reaction mixture before phosgenation.

12. The process of claim 9 wherein the phosgenation is carried out at a pH of from 8 to 11.

13. The process of claim 9 wherein the molecular weight regulator is a mono-hydroxy aromatic compound.

14. The process of claim 9 wherein polymerizing is carried out by the addition of a carbonate forming reagent in an amount effective for polymerizing the oligomers with the dicarboxylic acid.

15. The process of claim 14 wherein the carbonate forming reagent is phosgene.

16. The process of claim 14 carried out in the presence of a catalytic proportion of a polymerization catalyst.

17. The process of claim 16 wherein the catalyst is triethylamine.

18. The process of claim 16 carried out at a temperature of from 0° to 100° C.

19. The process of claim 16 carried out at a pH of from 10 to 12.5.

20. The process of claim 16 carried out in the presence of water in the reaction mixtures.

21. A process for the preparation of a thermoplastic copolyestercarbonate, which comprises;

a. phosgenating bisphenol-A in the presence of an inert solvent at a temperature within the range of from 0° to 100° C. at a pH within the range of from 8 to 11; whereby the corresponding bischloroformate oligomer is obtained;

b. upon completion of the phosgenation, capping bischloroformate oligomer with a mono-hydric phenol molecular weight regulator;

c. adding to the reaction mixture, an aliphatic dicarboxylic acid of the formula:

HOOC–(CH$_2$)$_n$–COOH wherein n is a whole number integer of from 6 to 12; and d. polymerizing the mixture of oligomer and aliphatic dicarboxylic acid at a temperature of from 0° to 100° C. in the presence of an effective amount of a polymerization catalyst and at a pH of from 10.0 to 12.5 with a carbonate forming reagent, 22. The process of claim 21 wherein the aliphatic dicarboxylic acid is added to the reaction mixture before phosgenation.

23. The process of claim 21 wherein the aliphatic dicarboxylic acid is added after phosgenation is complete.

24. The process of claim 21 wherein the carbonate forming reagent is phosgene.

* * * * *